United States Patent
Ishizaka et al.

[11] 3,818,241
[45] June 18, 1974

[54] LOAD CONTROLLING RECEIVER

[75] Inventors: Michihiro Ishizaka; Makoto Mikuriya, both of Amagasaki; Katsumi Taketa, Fukuyama, all of Japan

[73] Assignee: Mitsubishi Denki Kabushiki Kaisha, Tokyo, Japan

[22] Filed: Sept. 8, 1971

[21] Appl. No.: 178,689

[30] Foreign Application Priority Data
Sept. 8, 1970 Japan.............................. 45-78770
Dec. 28, 1970 Japan............................ 45-126079

[52] U.S. Cl.................. 307/140, 307/141, 317/138
[51] Int. Cl. ......................................... H01h 47/20
[58] Field of Search .......... 307/139, 140, 141, 129; 317/141 R, 141 S, 138, 147; 340/147 F, 171 R; 174/115

[56] References Cited
UNITED STATES PATENTS
| | | | |
|---|---|---|---|
| 2,637,843 | 5/1953 | Kammerdiener | 174/115 |
| 3,225,265 | 12/1965 | Krause et al. | 317/138 |
| 3,299,334 | 1/1967 | Ramadan | 307/140 |
| 3,413,608 | 11/1968 | Benzuly | 317/138 X |
| 3,460,121 | 8/1968 | Wattenburg | 307/140 X |
| 3,539,819 | 11/1970 | Parisoe | 307/129 X |
| 3,539,877 | 11/1970 | Davies | 307/129 X |
| 3,565,402 | 2/1971 | Linke | 317/147 X |
| 3,584,275 | 6/1971 | Paulson | 317/147 |
| 3,715,458 | 2/1973 | Bayes | 174/115 X |

FOREIGN PATENTS OR APPLICATIONS
1,046,165  12/1958  Germany...................... 200/153 W

*Primary Examiner*—James R. Scott
*Assistant Examiner*—William J. Smith
*Attorney, Agent, or Firm*—Oblon, Fisher, Spivak, McClelland & Maier

[57] ABSTRACT

A load controlling receiver for controlling the application of power to a load in response to a control signal is disclosed. The load controlling receiver includes a remote control relay which includes a time delay to prevent triggering due to noise or spurious signals. The relay is switched by control signals of specific frequencies. A central control unit is coupled to the relay circuit by means of a composite conductor including the ground or neutral conductor of a low voltage distribution line.

11 Claims, 4 Drawing Figures

3,818,241

LOAD CONTROLLING RECEIVER

BACKGROUND OF THE INVENTION

1. Field Of The Invention

This invention relates to power switching circuits, and more particularly to remote control relays.

2. Description Of The Prior Art

Systems have been known in the past for centrally controlling one or more loads by using the low voltage side of a power distribution line to carry a control signal. In such systems, however, the controlling signal was directly applied to the low voltage power distribution lines. Accordingly, most of the energy of the control signal was lost, and the efficiency of the control signal was accordingly very low.

SUMMARY OF THE INVENTION

Accordingly, one object of this invention is to provide a load controlling receiver in which the control signal is used with high efficiency.

Another object of this invention is to provide a remote control relay which is resistant to spurious or noise signals.

A further object of this invention is to provide a novel remote controlled relay structure.

A still further object of this invention is to provide a frequency responsive remote control switching circuit.

Briefly, these and other objects of the invention are achieved by providing an electronic remote control relay circuit. The electronic remote control relay circuit includes frequency responsive control elements for permitting the electronic remote control relay circuit to be operated by control signals of various frequencies. A delay means is built into the electronic remote control relay circuit to reduce its susceptibility to spurious or noise signals. Control signals are supplied to the electronic remote control relay circuit by means of a composite line including the neutral conductor of a low voltage distribution line.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings, wherein.

DETAILED DESCRIPTION OF THE PREFERRED EMBODIMENTS

Figure 1:
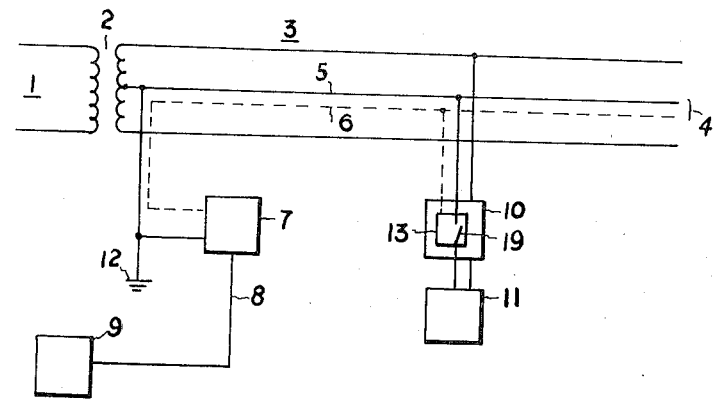
FIG. 1 is a block diagram illustrating a remote control network and control signal distribution line according to the instant invention.

Referring now to the Drawings, wherein like reference numerals designate identical or corresponding parts throughout the several views, and more particularly to FIG. 1 thereof, the overall system of the present invention is shown. A high voltage power distribution line 1 is shown coupled to the primary winding of a transformer 2, which may be of the type normally found mounted on utility poles, for example. A low voltage power distribution line 3 is shown coupled to the secondary windings of the transformer 2. The low voltage power distribution line 3 includes a composite line 4 which includes a neutral or ground conductor 5 and a pilot or control signal line 6. A gauge examination controlling repeater, or control signal converter 7 is coupled at its output to lines 5 and 6. As shown in FIG. 1, the neutral conductor or line 5 is coupled to ground or another suitable reference potential 12. The control signal converter 7 is coupled through a line 8 to a gauge examination controlling center, or central control unit 9. The central control unit 9 may consist of a thermostat or equivalent type of automatic controller which may be set or adjusted to control the energization of one or more remotely located loads 11.

In operation, the central control unit 9 develops a control signal which is applied over the line 8 to the control signal converter 7. The control signal converter 7 may include a voltage-to-frequency converter, or some equivalent type of system which produces a variable frequency output in response to the control signal input received over line 8. For example, the output of the control signal converter 7 may be a signal of a first frequency $f_1$, representing an "ON" command from the central control unit 9, or may be a signal of frequency $f_2$, representing an "OFF" signal from the central control unit 9. These variable frequency control signals are applied by the control signal converter 7 to the composite line 4 for transmission to one or more load controlling receivers, or remote control relays 10.

Each of the remote control relays 10 includes a frequency responsive control circuit 13 and a power switch 19. The power switch 19 is coupled between the low power distribution line 3 and the load 11 to be controlled. The load 11 may constitute a heater unit, of the type customarily included in centrally controlled hot water heaters, for example. The frequency responsive control circuit 13 operates the power switch 19 in response to appropriate control signals received from the central control unit 9. The use of the composite line 4 to transmit control signals from the central control unit 9 to the frequency responsive control circuit 13 electrically separates all of the control circuitry from the power distribution line 3, thereby rendering the control system substantially more efficient, more reliable, and less susceptible to power distribution line noise. This arrangement reduces transmission losses in the control signal and permits the use of a relatively low power central control unit. In addition, noise problems in the control circuit are substantially reduced improving the reliability of the control circuits 13 included in each of the remote control relays 10. Furthermore, the control circuit 13 can be comprised of elements having a relatively low breakdown voltage, since these elements operate only with the relatively low control voltages, and are not exposed to the higher voltages from the power distribution line.

Figure 2:
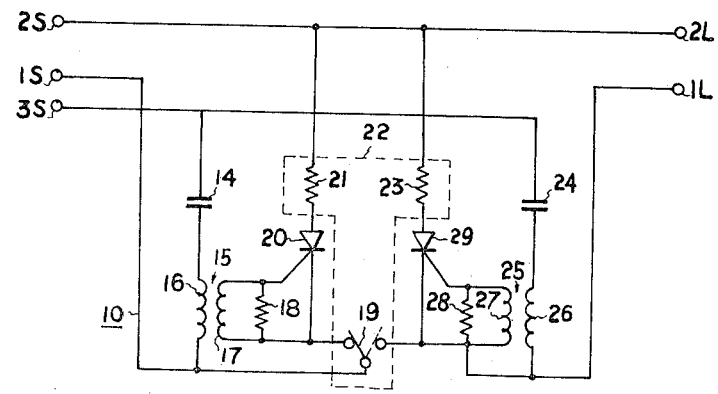
FIG. 2 is a circuit diagram of one embodiment of the load controlling receiver or remote control relay of the instant invention.

A circuit diagram of the remote control relay 10 is illustrated in FIG. 2. A plurality of power source terminals 1S, 2S and 3S are provided for coupling the remote control relay 10 to the power source. For example, the source terminal 1S may be connected to the neutral conductor 5 of the low voltage distribution line 3, and the power source terminal 2S may be connected to the high voltage line of the power distribution line 3. The source terminal 3S may be connected to the central control unit 9 through the pilot or control signal line 6. A pair of output or load terminals 1L and 2L are coupled to the load circuit to be controlled, which may be an electric heater for hot water, for example.

The circuit of FIG. 2 also includes a pair of resonance condensers or capacitors 14 and 24. A first transformer 15 is provided, having a primary winding 16 coupled in series with capacitor 14 and a secondary winding 17 associated with the primary winding 16. A second transformer 25 is also provided, having a primary winding 26 coupled in series with the capacitor 24 and having a secondary winding 27 associated with the primary winding 26.

A first thyristor 20 is coupled between a heater element 21 and one terminal of the secondary winding 17 of the first transformer 15. The gate electrode of the thyristor 20 is coupled to the other terminal of the secondary winding 17. A gate protecting resistance 18 is coupled in parallel with the secondary winding 17.

Similarly, a second thyristor 29 is provided which is coupled between a second heater element 23 and one terminal of the secondary winding 27 of the second transformer 25. The gate electrode of the thyristor 29 is coupled to the other terminal of secondary winding 27, and a gate protecting resistor 28 is coupled in parallel with the secondary winding 27.

The heater elements 21 and 23 may be operatively associated with two heat deformable bimetal strips, which form the contacts of a power switch 19, thereby forming a thermal driving relay designated 22.

In operation, the first resonance capacitor 14 together with the first transformer 15 form a first resonant circuit which may be tuned to an appropriate frequency $f_1$. Similarly, the second resonance capacitor 24 together with the second transformer 25 constitutes a second resonant circuit, which may be tuned to a second resonant frequency $f_2$. Thus, when an "ON" signal is generated by the central control unit 9, and is converted into an appropriate signal frequency such as $f_1$, this signal is applied to the terminal 3S of the remote control relay 10. Since the first resonant circuit is tuned to the frequency $f_1$, the resonance capacitor 14 and the primary winding 16 of transformer 15 are caused to resonate, resulting in a maximum voltage across the primary winding 16. This voltage induces a voltage in the secondary winding 17 which is applied to the gate electrode of thyristor 20. Thyristor 20 is thus actuated causing current to be supplied from the power line coupling terminals 2S and 2L through the heater element 21. The heater element 21 then causes a bimetal element in the power switch 19 to deform, as shown by the dotted line, causing terminal 1S to be coupled to terminal 1L. When the power switch is in this configuration, power is supplied to load 11 until an "OFF" control signal is received.

The "OFF" signal, having a frequency $f_2$, causes the second resonant circuit to operate in substantially the same manner as the first resonant circuit. That is, the control signal of frequency $f_2$ causes the capacitor 24 to resonate with the primary winding 26 of the transformer 25. Thus, a voltage is induced in the secondary winding 27 of the transformer 25, triggering thyristor 29 and activating the heater 23. Heater 23 causes the power switch 19 to be switched back to the position illustrated by the solid line, thereby stopping the flow of power to the load 11.

It will be noted that the resonant circuits utilized in the control system of the present invention require very little power, and thus the control circuits may be constructed economically of small components having relatively low current capacities. In addition, the thermal driving relay 22 includes an inherent time delay since the heater elements do not respond immediately. This delay prevents actuation of the switching circuitry by noise or spurious signals.

Figure 3:
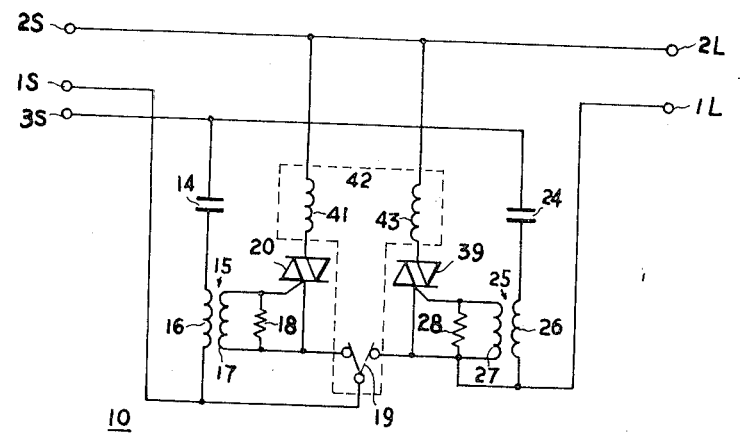
FIG. 3 is a circuit diagram of another embodiment of the load controlling receiver or power switching relay of the instant invention; and, FIG. 4 is a circuit diagram of yet another embodiment of the load controlling receiver or remote control relay in accordance with the instant invention.

Another embodiment of the remote control relay of the instant invention is shown in FIG. 3. In this embodiment, the thyristors 20 and 29 have been replaced with bidirectional thyristors 30 and 39, respectively. In addition, the thermal self-sustaining relay 22 of the FIG. 2 embodiment has been replaced with an AC type self-sustaining electromagnetic relay 42. This relay includes driving coils 41 and 43 in place of the heaters 21 and 23, respectively, of the FIG. 2 embodiment.

The operation of the remote control relay illustrated in FIG. 3 is substantially the same as that of FIG. 2. When a control signal of frequency $f_1$ is received, the first resonant circuit is caused to resonate, resulting in a voltage being induced in secondary winding 17. This voltage is applied to the gate electrode of the bidirectional thyristor 30, triggering the thyristor and actuating driving coil 41. The driving coil 41 switches the power switch 19 to the position illustrated by the dotted line, applying power to the load terminals 1L and 2L.

Similarly, when a control signal of frequency $f_2$ is received, the second resonant circuit is caused to resonate, inducing a voltage in secondary winding 27 which triggers the second bidirectional thyristor 39. The bidirectional thyristor 39 in turn causes current to flow through the second driving coil 43, causing the power switch 19 to be driven back to the position illustrated by the solid line in FIG. 3.

Figure 4:
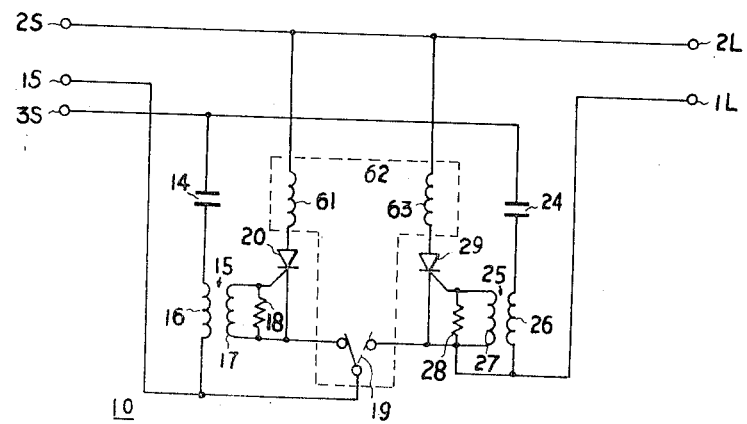

Yet another embodiment of the invention is illustrated in FIG. 4. This embodiment of the invention is substantially identical to that of FIG. 2, with the exception that the self-sustaining thermal relay 22 has been replaced by a DC type self-sustaining electromagnetic relay 62, including driving coils 61 and 63. The resonant portions of this circuit operate in a manner identical to that described with respect to the embodiment of FIG. 2. However, only rectified or half-wave AC currents pass through the thyristors 20 and 29. However, this rectified AC or pulsating DC current is sufficient to activate the driving coils 61 and 63 of the self-sustaining electromagnetic relay 62. The driving coils actuate the switch 19 in the manner previously described, depending upon the frequency of the control signals.

The thermal relay illustrated in FIG. 2 requires an interval of from approximately 30 to approximately 50 seconds for its activation. That is, 30 to 50 seconds may elapse between the time at which a control signal is first received and the time at which the thermal relay responds by appropriately changing the position of the power switch 19. Accordingly, when a thermal relay such as 22 is used, the control signal converter 7 must supply a control signal continuously for about 1 minute. However, when electromagnetic relays of the type illustrated in FIGS. 3 and 4 are used, it is possible to substantially reduce the driving time of the relay. Accordingly, electromagnetic relays can be employed where rapid driving is important. In addition, electromagnetic relays are essentially independent of thermal environmental conditions, while thermal relays are quite dependent on such conditions.

Although the present invention is illustrated in FIG. 1 as employing a pilot or control line in conjunction with a neutral or ground line, a completely separate control line having two conductors, both of which are independent of the power distribution line, may also be used.

Accordingly, the present invention describes a reliable and economical remote control relay circuit which may be combined with a centrally located automatic control unit.

Obviously, numerous additional modifications and variations of the present invention are possible in light of the above teachings. It is therefore to be understood that within the scope of the appended Claims, the invention may be practiced otherwise than as specifically described herein.

What is claimed as new and desired to be secured by Letters Patent of the United States is:

1. A noise immune load controller comprising:
   a low voltage alternating current power distribution line including a ground conductor,
   a control signal conductor, said ground conductor and control signal conductor forming a composite line; and remote control means coupled to said control signal line and responsive to signals transmitted over said control signal line,
   said remote control means including a power switching mechanism for selectively coupling low voltage power distribution line to a load and further including switching delay means so that a susceptibility of said load to noise signals on said composite line is reduced,
   whereby said load is selectively energized in response to remotely generated control signals of said composite line.

2. A noise immune load controller as in claim 1, wherein:
   said remote control means includes first and second resonant circuits, each of said resonant circuits including capacitor means and inductor means,
   said first resonant circuit tuned to resonate at a first discrete frequency and said second resonant circuit tuned to resonate at a second discrete frequency.

3. A noise immune load controller as in claim 1 wherein:
   said remote control means includes
   a pair of electronic switching elements coupled across said low voltage power distribution line said electronic switching elements controllable independently of one another; and
   said switching delay means includes self-sustaining relay means driven by said electronic switching element for operating said power switching mechanism.

4. A noise immune load controller as in claim 1, wherein:
   said control signal line includes said ground conductor of said low voltage power distribution line.

5. A noise immune load controller as in claim 4, wherein:
   said remote control means includes first and second resonant circuits, each of said resonant circuits including capacitor means and inductor means,
   said first resonant circuit tuned to resonate at a first discrete frequency and said second resonant circuit tuned to resonate at a second discrete frequency.

6. A load controller as in claim 4 wherein:
   said remote control means includes
   a pair of electronic switching elements coupled across said low voltage power distribution line said electronic switching elements controllable independently of one another; and
   said switching delay means includes self-sustaining relay means driven by said electronic switching elements for operating said power switching mechanism.

7. A noise immune load controller as in claim 3, wherein:
   said self-sustaining relay means is a thermal relay.

8. A noise immune load controller as in claim 3, wherein:
   said self-sustaining relay means is a DC electromagnetic relay.

9. A noise immune load controller as in claim 3, wherein:
   said self-sustaining relay is an AC electromagnetic relay.

10. A noise immune load controller as in claim 2 further comprising:
    first and second electronic switching means coupled to and controlled by said first and second resonant circuits respectively;
    said switching delay means including
    first and second heating elements coupled to and energized by said first and second electronic switching means respectively; and
    thermal relay means actuated by said first and second heating elements.

11. A noise immune load controller comprising:
    a low voltage alternating current power distribution line including a ground conductor;
    a control signal conductor said ground conductor and said control signal conductor forming a composite line;
    a central control unit controlling a control signal converter to impress a variable frequency control signal onto said composite line;
    remote control means including a tuned receiver coupled to said low voltage alternating current power distribution line in response to said variable frequency control signals transmitted over said composite line to selectively couple said low voltage alternating current power distribution line to a load;
    means to prevent a coupling of said low voltage alternating current power distribution line to said load for a delay period so that a susceptibility of said remote control means to electrical noise on said composite line is reduced;
    whereby said load is selectively energized in response to control signals generated over said composite line by said central control unit and said control signal coverter.

\* \* \* \* \*